US010949057B2

(12) United States Patent
DiVerdi et al.

(10) Patent No.: US 10,949,057 B2
(45) Date of Patent: *Mar. 16, 2021

(54) POSITION-DEPENDENT MODIFICATION OF DESCRIPTIVE CONTENT IN A VIRTUAL REALITY ENVIRONMENT

(71) Applicant: Adobe Inc., San Jose, CA (US)

(72) Inventors: Stephen DiVerdi, Oakland, CA (US); Seth Walker, Oakland, CA (US); Brian Williams, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,765

(22) Filed: Apr. 14, 2020

(65) Prior Publication Data

US 2020/0241730 A1    Jul. 30, 2020

Related U.S. Application Data

(63) Continuation of application No. 15/816,280, filed on Nov. 17, 2017, now Pat. No. 10,671,238.

(51) Int. Cl.
*G06F 3/0481* (2013.01)
*G06T 19/00* (2011.01)
(Continued)

(52) U.S. Cl.
CPC ........ *G06F 3/04815* (2013.01); *G06F 3/0346* (2013.01); *G06F 9/451* (2018.02);
(Continued)

(58) Field of Classification Search
CPC .... G06F 3/04815; G06F 3/0346; G06F 9/451; G06T 19/00; G06T 19/20
See application file for complete search history.

(56) References Cited

U.S. PATENT DOCUMENTS 10,521,944 B2 * 12/2019 Sareen .................... G06F 3/017
2007/0067798 A1 * 3/2007 Wroblewski ......... H04N 21/482
725/37

(Continued)

OTHER PUBLICATIONS

Nguyen, et al., "CollaVR: Collaborative In-Headset Review for VR Video", http://web.cecs.pdx.edu/~fliu/project/collavr/, 2017.

(Continued)

*Primary Examiner* — Phenuel S Salomon
(74) *Attorney, Agent, or Firm* — Kilpatrick Townsend & Stockton LLP (57) ABSTRACT

Techniques are described for modifying a virtual reality environment to include or remove contextual information describing a virtual object within the virtual reality environment. The virtual object includes a user interface object associated with a development user interface of the virtual reality environment. In some cases, the contextual information includes information describing functions of controls included on the user interface object. In some cases, the virtual reality environment is modified based on a distance between the location of the user interface object and a location of a viewpoint within the virtual reality environment. Additionally or alternatively, the virtual reality environment is modified based on an elapsed time of the location of the user interface object remaining in a location.

20 Claims, 7 Drawing Sheets

(51) Int. Cl.
    *G06F 3/0346*     (2013.01)
    *G06F 9/451*     (2018.01)
    *G06T 19/20*     (2011.01)

(52) U.S. Cl.
    CPC .............. *G06T 19/00* (2013.01); *G06T 19/20* (2013.01); *G06T 2219/004* (2013.01)

(56) References Cited

U.S. PATENT DOCUMENTS

| | | | | |
|---|---|---|---|---|
| 2012/0013613 A1* | 1/2012 | Vesely | ................... | G06F 3/013 |
| | | | | 345/419 |
| 2012/0110447 A1* | 5/2012 | Chen | ................... | G06F 3/0488 |
| | | | | 715/702 |
| 2012/0272179 A1* | 10/2012 | Stafford | ................. | G06F 3/038 |
| | | | | 715/781 |
| 2016/0257000 A1* | 9/2016 | Guerin | .................. | B25J 9/1605 |
| 2017/0139556 A1* | 5/2017 | Josephson | ........... | G06F 3/04847 |
| 2018/0136744 A1* | 5/2018 | Karlsson | ................ | G06F 3/011 |
| 2019/0130631 A1* | 5/2019 | Gebbie | .................. | G06T 7/536 |

OTHER PUBLICATIONS

Nguyen, et al., "Vremiere: In-Headset Virtual Reality Video Editing", Portland State University, Adobe Research, 2017.

\* cited by examiner

POSITION-DEPENDENT MODIFICATION OF DESCRIPTIVE CONTENT IN A VIRTUAL REALITY ENVIRONMENT

RELATED APPLICATIONS

The present application claims priority to U.S. application Ser. No. 15/816,280 for "Position-dependent modification of descriptive content in a virtual reality environment" filed Nov. 17, 2017, which is incorporated by reference herein in its entirety.

FIELD OF THE INVENTION

This disclosure relates generally to the field of virtual reality, and more specifically relates to user interface accessibility of virtual reality environments.

BACKGROUND

Virtual reality ("VR") is becoming a ubiquitous part of daily computing environments. Advances in both hardware and software allow applications to more commonly include VR elements. However, user interface ("UI") controls in VR environments behave in ways that seem unexpected to a user who is unfamiliar with the VR environment. In addition, UI controls in a VR environment can change behavior based on the context of the control within the VR environment.

A developer of a VR environment may provide information describing the function or behavior of UI controls in the VR environment, such as by displaying information adjacent to the control, providing help documentation, or providing a tutorial time period or area. However, the information can be provided in a manner that is inappropriate for a user's needs. For example, providing information describing each control in all contexts may clutter the VR environment and obscure the activity that the user is attempting to perform, frustrating the user and reducing the usefulness of the VR environment. In addition, a tutorial provides a limited area or time in which the UI controls are carefully explained to the user. However, a tutorial does not provide information in all areas or time periods of the VR environment. A user who is in a non-tutorial area or time period is unable to access helpful information if he or she is presented with a new context in the non-tutorial area or time period. Furthermore, providing information in help documentation can be distracting and time-consuming, as the user would need to move his or her attention away from the current activity in order to view the help documentation. In addition, it may be frustrating for a user to research an unfamiliar control or context in help documentation.

It is desirable for information describing UI controls in a VR environment to be available in all contexts of the VR environment. In addition, it is desirable for such contextual information to be hidden until an indication is received from the user that contextual information is requested.

SUMMARY

According to certain embodiments, a VR environment is modified to provide contextual information for an object in the VR environment, based on the object's position within the VR environment. The position of the object is determined within the VR environment. In addition, a position of the user's viewpoint within the VR environment is determined. A distance between the object position and the viewpoint position is determined, and compared to a threshold distance. In some cases, the threshold distance is modified by a hysteresis parameter. Based on the comparison of the distance between the object and the viewpoint to the threshold distance, the VR environment is modified to include contextual information for the object.

In some cases, the VR environment is modified to provide contextual information for the object, based on the object's position at a particular location within the VR environment. The position of the object is determined within the VR environment, and compared to a previous position of the object. Based on a similarity between the position and the previous position, a cumulative amount of motion is determined, the cumulative motion indicating how much motion the object has in a window of time. The cumulative motion is compared to a threshold amount of motion. In some cases, the threshold amount of motion is modified by a hysteresis parameter. Based on the comparison of the cumulative motion to the threshold amount of motion, the VR environment is modified to include contextual information for the object.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

As discussed above, prior techniques for providing contextual information of an object, such as a UI object, in a VR environment do not provide the contextual information in appropriate contexts of the VR environment. Certain embodiments described herein provide for modifying the VR environment to include contextual information of a UI object, based on the object's location within the VR environment.

The following examples are provided to introduce certain embodiments of the present disclosure. A VR environment includes a viewpoint and a UI object. The viewpoint and the UI object are associated with, for example, one or more output or input devices used by a user to interact with the VR environment. Within the VR environment, the UI object has an object location and the viewpoint has a viewpoint location. Based on one or more of the object location and the viewpoint location, the VR environment is modified to include contextual information describing the UI object. The contextual information describes, for example, one or more functions of the UI object, such as functions that allow the user to affect the VR environment. In some cases, a distance between the object location and the viewpoint location is determined and compared to a threshold distance. The VR environment is modified to include the contextual information based on a determination that the distance is within the threshold distance. Additionally or alternatively, the VR environment is modified to remove the contextual information based on a determination that the distance exceeds the threshold distance. In some cases, the object location is compared to one or more previous locations of the UI object, and a cumulative amount of motion is determined for the object (e.g., an amount of motion of the UI object over a period of time). The VR environment is modified to include the contextual information based on a determination that the cumulative motion is less than a threshold amount of motion. Additionally or alternatively, the VR environment is modified to remove the contextual information based on a determination that the cumulative motion exceeds the threshold amount of motion.

As used herein, the terms "virtual reality" and "VR" refer to a computing environment that is wholly or partially included in a virtual space (e.g., a perceived space that is not embodied by physical components). A virtual reality environment is implemented by any suitable combination of hardware or software, including (without limitation) cameras, projectors (e.g., simulated display projected onto eyewear), accelerometers, pressure switches, sensors worn by the user (e.g., head position sensors), emitters worn by the user (e.g., gloves with light-emitting diodes), or any other suitable device or module. In some cases, a VR environment includes non-virtual components. For example, a computing environment that includes both physical components (e.g., a keyboard and display) and virtual components (e.g., additional projected displays and a cursor enabled by eye-tracking) is considered as a VR environment herein, unless otherwise indicated.

As used herein, the terms "user interface" and "UI" refer to a collection of components that are associated with an application and that allow the application to receive inputs from a user and provide outputs to a user. In some embodiments, a user interface is implemented in either a VR environment, a physical environment, or both. In some embodiments, a user interface receives inputs from a user from components such as (without limitation) a keyboard, a mouse, a touchscreen, a microphone, a light or laser pointer, wearable sensors, software components implemented in a VR environment, or any other suitable components or combination of components. In some embodiments, a user interface provides outputs to a user from components such as (without limitation) a display screen, a touchscreen, wearable display devices (e.g., display glasses, wrist-mounted display), a projector, speakers, earphones/ear pieces, wearable sensors, software components implemented in a VR environment, or any other suitable components or combination of components.

In some embodiments, a user interface is related to development of the VR environment. For example, a development UI includes one or more tools, menus, or functions that allow a user, such as a developer, to create, remove, or modify portions or aspects of the VR environment. As a non-limiting example, a "texture menu" included in a development UI includes one or more tools allowing a developer to create, remove, or modify colors or patterns of surfaces and objects within the VR environment, such that the colors and patterns selected by the developer are perceived by another user (e.g., a viewer) of the VR environment.

As used herein, the term "user interface object" refers to a virtual object, within a VR environment, that includes one or more functions that allow a user to interact with the VR environment. For example, a UI object associated with a developer UI includes functions that allow a developer to create, remove, or modify portions or aspects of the VR environment. As a non-limiting example, a UI object includes functions associated with a texture menu, as described above. In some embodiments, a UI object includes multiple controls (e.g., virtual buttons, virtual sliders), and each control is associated with a different function having a different effect on the VR environment.

As used herein, the term "viewpoint" refers to a virtual point within a VR environment from which the user views the VR environment. For example, a viewpoint is associated with a field of view, in which the user observes a portion of the VR environment. In some cases, a viewpoint is associated with multiple fields of view, such as multiple portions of the VR environment displayed to the user (e.g., forward- and backwards-facing fields of view, simulation of three-dimensional displays).

Figure 1:
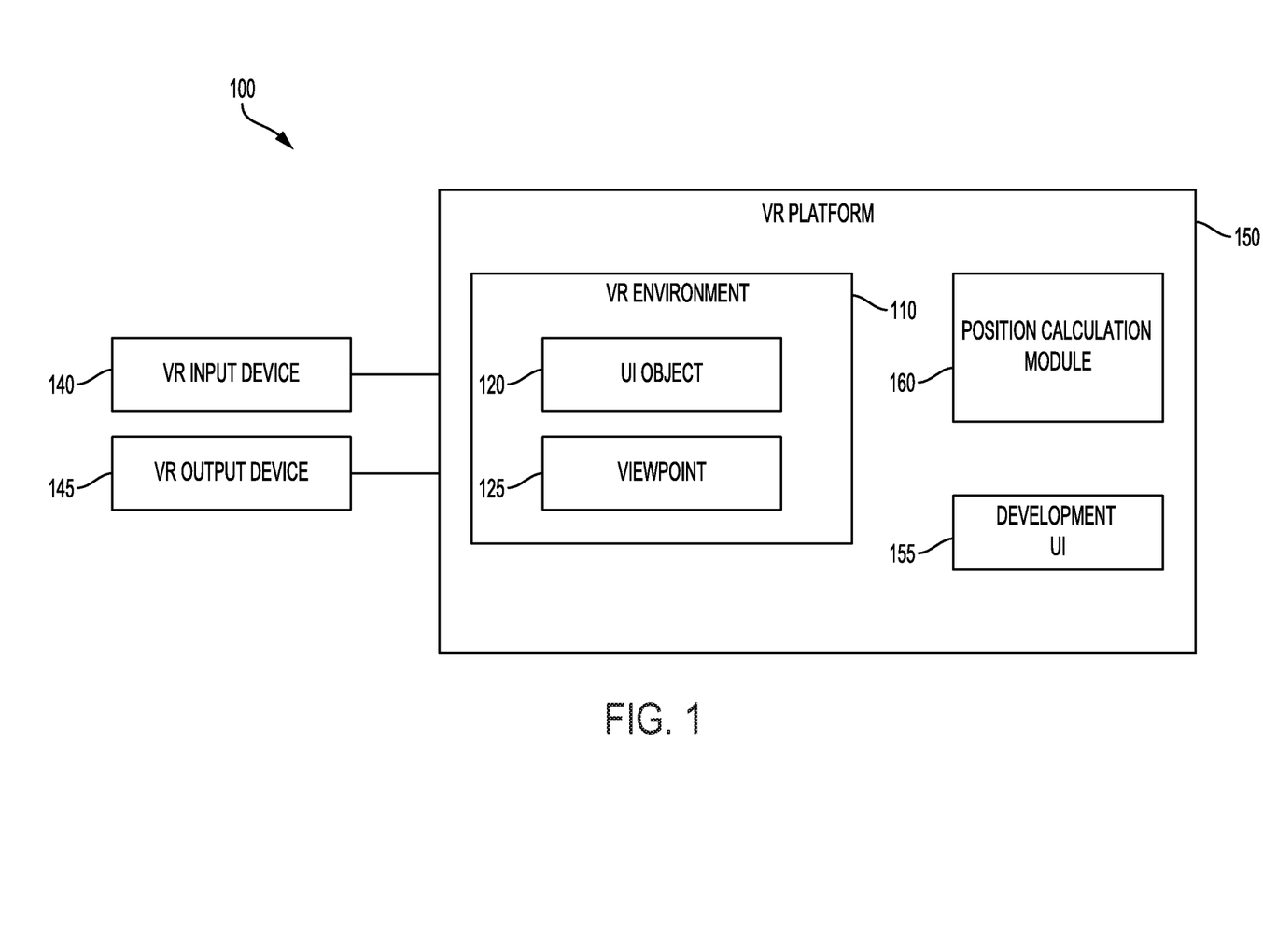
FIG. 1 is a block diagram depicting an example of a system in which a VR environment operating on a VR platform is modified, according to certain embodiments.

Referring now to the drawings, FIG. 1 depicts an example of a system 100 in which a VR environment 110 is modified. In the system 100, a VR platform 150 provides the VR environment 110. The VR environment 110 is associated with one or more parameters, such as a coordinate system, dimensions of one or more virtual spaces, appearance and locations of virtual objects, or other suitable parameters. In some cases, the VR platform 150 includes one or more computing systems that are configured to perform operations related to the VR environment 120. For example, the VR platform 150 is configured to determine the parameters of the VR environment 110. Additionally or alternatively, the VR platform 150 is configured to provide one or more objects, such as UI object 120, or viewpoints, such as viewpoint 125, within the VR environment 110.

In some embodiments, the VR platform 150 is configured to perform operations related to altering the VR environment 110. For example, a development platform including the VR platform 150 provides one or more functions (e.g., "tools," "toolkits") that allow a user, such as a designer, to create, modify, or remove portions of the VR environment 110 or associated parameters. The VR platform 150 includes a development UI 155 that allows the user to interact with the tools to alter the VR environment 110. In some embodiments, the development UI 155 provides one or more portions of the VR environment 110 that are related to development of the VR environment 110. For example, the development UI 155 provides (or provides information to VR platform 150 to provide) a UI object 120 that is included in the VR environment 110. For example, the UI object 120 includes at least one virtual object that is associated with one or more tools accessible by the development UI 155. A user accesses the associated tools by interacting with the UI object 120, such as by interacting with a virtual button that is included on the UI object 120.

Additionally or alternatively, the VR platform 150 is configured to perform operations related to providing outputs and receiving inputs that are related to the VR environment 110. For example, the VR platform 150 receives from a VR input device 140 one or more inputs from the user. The VR input device 140 includes one or more of, for example, a keyboard, a mouse, a joystick, a microphone, a touchscreen, a positional or gestural device (e.g., via camera, via accelerometer) The received inputs include one or more of, for example, signals, data structures, computer operations, or other suitable information describing inputs from the VR input device 140. The VR platform 150 receives the inputs, and based on the included information, modifies the VR environment 110. For example, the VR platform 150 modifies a parameter of the VR environment 110 based on information indicating an interaction with the UI object 120. Additionally or alternatively, the VR platform 150 modifies a location of the UI object 120 or the viewpoint 125 within the VR environment 110.

In some embodiments, the VR platform 150 provides to a VR output device 145 one or more outputs related to the VR environment 110. The VR output device 145 includes one or more of, for example, a display screen (including a wearable display or multi-screen displays), a speaker, headphones, a touchscreen, a tactile output device (e.g., vibration devices or tactile surfaces), or any other suitable output device. The provided outputs include one or more of, for example, signals, data structures, computer operations, or other suitable information describing some or all of the VR environment 110. The VR output device 145 receives the outputs, and based on the included information, provides a representation of some or all of the VR environment 110. For example, the VR output device 145 includes a display device, and provides visual information representing a portion of the VR environment 110. Additionally or alternatively, the VR output device 145 includes an audio device, and provides audible information representing a portion of the VR environment 110. In some cases, the VR output device 145 provides multiple types of information, such as a headset that provides visual information via a display device and audible information via an audio device. Additionally or alternatively, the VR input device 140 and the VR output device 145 are included in a particular device, such as a touch screen that provides visual information and receives inputs.

In some embodiments, the VR platform 150 is configured to determine one or more positions associated with the UI object 120 and the viewpoint 125. In some cases, the position includes one or more of a location or an orientation. For example, a position calculation module 160 included in the VR platform 150 performs operations related to determining one or more of an object location or orientation, or a viewpoint location or orientation. For example, the position calculation module 160 determines a location, such as a position of the object (or viewpoint) within a frame of reference. Additionally or alternatively, the position calculation module 160 determines an orientation, such as a direction that the object (or viewpoint) is pointed within the frame of reference.

In some cases, the position calculation module 160 determines a virtual location or a virtual orientation within the VR environment 110, including an absolute or relative location or orientation based on a coordinate system of the VR environment 110. Additionally or alternatively, position calculation module 160 determines a physical location or a physical orientation associated with the UI object 120 or the viewpoint 125. The physical location or physical orientation are determined, for example, based on information received by the VR platform 150, such as information from an accelerometer, a camera, a pressure sensor, a proximity sensor, or other suitable information. For example, based on information received from the VR input device 140, the position calculation module 160 determines a physical object location associated with one or more of the VR input device 140 or the UI object 120. Additionally or alternatively, based on information received from the VR output device 145, the position calculation module 160 determines a physical viewpoint location associated with one or more of the VR output device 145 or the viewpoint 125. In some cases, a physical location (or physical orientation) is associated with a virtual location (or virtual orientation). For example, the position calculation module 160 associates a physical object location of the VR input device 140 with a virtual object location of the UI object 120. Additionally or alternatively, the position calculation module 160 associates physical viewpoint location of the VR output device 145 with the virtual viewpoint location of viewpoint 125.

In system 100, the VR platform 150 is configured to modify a portion of the VR environment 110 that is associated with development UI 155. For example, based on input information indicating an additional interaction with the UI object 120, the VR platform 150 modifies one or more of an appearance of UI object 120 or an association with a tool (e.g., changing between tools assigned to a virtual button). In some cases, the VR platform 150 modifies a portion of the VR environment 110 based on one or more of the locations associated with the UI object 120 and the viewpoint 125. Based on the object location, for example, the VR platform 150 modifies a parameter of the VR environment 110 related to the UI object 120, such as an appearance or function of the UI object 120. Additionally or alternatively, based on information indicating a location of one or more of the viewpoint 125 or the UI object 120, the VR platform 150 modifies the VR environment 110 to include (or remove) information associated with the development UI 155. The information is provided, for example, as an output provided to VR output device 145. For example, based on a distance between the locations of viewpoint 125 and the UI object 120, the VR platform 150 modifies the VR environment 110 to include information describing a tool associated with the UI object 125, such as an explanation of the tool's function. Additionally or alternatively, based on a distance between the locations of the UI object 120 and an additional object in the VR environment 110, the VR platform 150 modifies the VR environment 110 to include information describing the additional object, such as values of parameters for the additional object.

Figure 2:
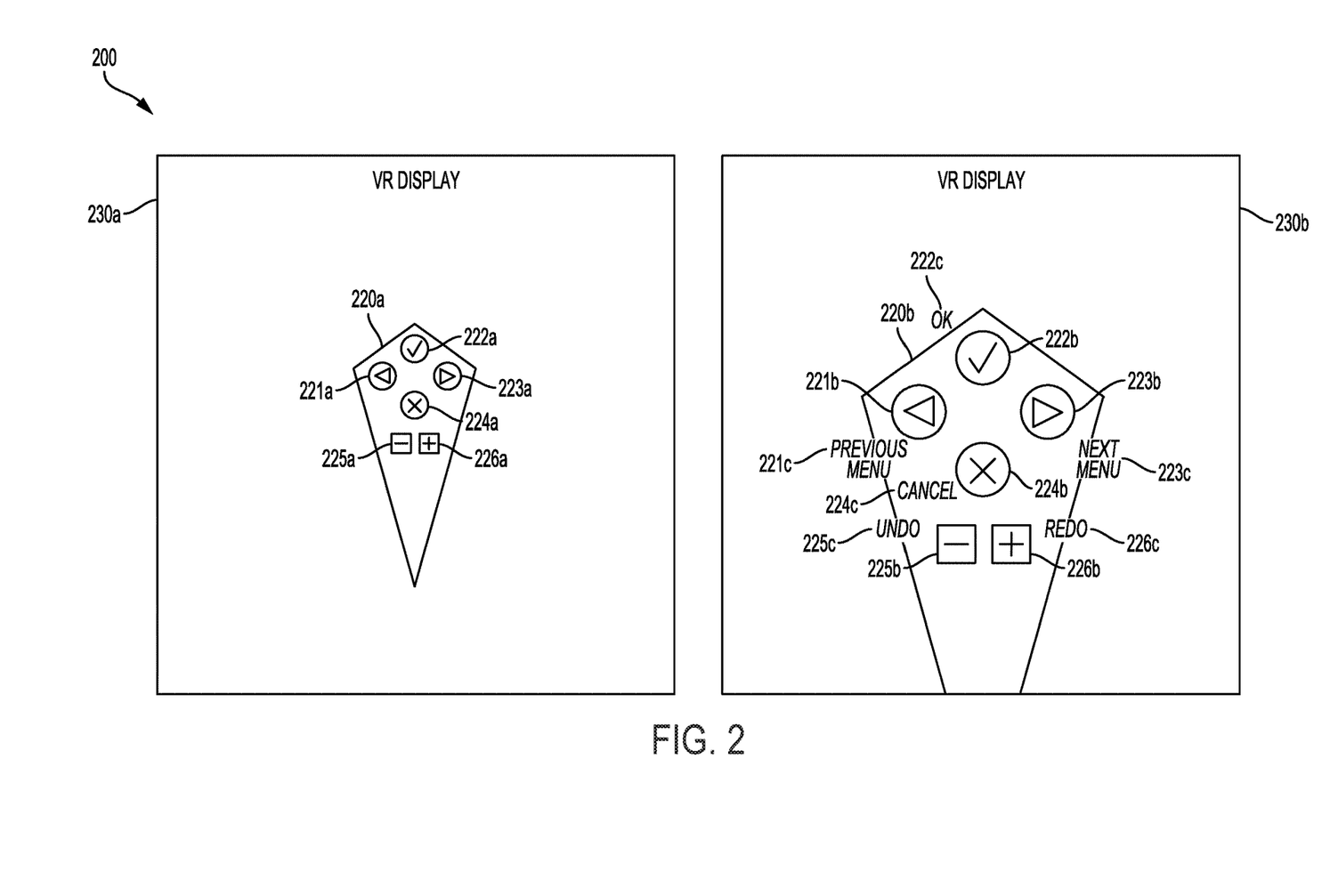
FIG. 2 is a diagram depicting an example of modified displays within a VR environment, according to certain embodiments.

In some embodiments, a VR environment is modified to include, or to remove, contextual information describing a virtual object. For example, the contextual information describes the present functions associated with a UI object within the VR environment. FIG. 2 depicts examples of VR displays 230a and 230b of a VR environment 200. In FIG. 2, the VR display 230a depicts a modification of the VR environment 200 at a point in time, and VR the display 230b depicts another modification of the VR environment 200 at another point in time. However, other implementations are possible, such as multiple displays associated with multiple viewpoints within a VR environment. The VR displays 230a and 230b are provided, such as by the VR platform 150, and are viewed by a user, such as via the VR output device 145. Each of the VR displays 230*a* and 230*b* are associated with a respective viewpoint having a respective viewpoint location.

A UI object is provided within the VR environment 200. The UI object provides access to tools included in a development toolkit, such as a toolkit associated with development UI 155. In some cases, the provided UI object is displayed with one or more attributes based on a context of the VR environment 200. For example, the provided UI object has an appearance, such the appearance of one of displayed objects 220*a* or 220*b*, based on a context of the VR environment 200, such as a location, orientation, user interaction, menu setting, or other suitable context. In FIG. 2, the VR display 230*a* includes the UI object having the appearance of displayed object 220*a*. In the VR display 230*a*, the displayed object 220*a* includes controls (such as buttons 221*a*, 222*a*, 223*a*, 224*a*, 225*a*, and 226*a*) that are associated with one or more tools included the development toolkit. Additionally or alternatively, the VR display 230*a* depicts a first modification of the VR environment 200 that includes visual information indicating the displayed object 220*a* and buttons 221*a*-226*a* from the viewpoint associated with the VR display 230*a*, and removes contextual information describing the buttons 221*a*-226*a*.

Additionally in FIG. 2, the VR display 230*b* includes the UI object having the appearance of displayed object 220*b*. In the VR display 230*b*, the displayed object 220*b* includes controls (such as buttons 221*b*, 222*b*, 223*b*, 224*b*, 225*b*, and 226*b*) that are associated with the one or more tools included the development toolkit. Additionally or alternatively, the VR display 230*b* depicts a second modification of the VR environment 200 that includes visual information indicating the displayed object 220*b* and buttons 221*a*-226*b* from the viewpoint associated with the VR display 230*b*, and includes contextual information (such as text items 221*c*, 222*c*, 223*c*, 224*c*, 225*c*, and 226*c*) describing the buttons 221*b*-226*b*. For example, the text item 221*c* describes the button 221*b*, and indicates a function of the tool associated with the button 221*b*. In addition, each of the text items 222*c*-226*c* describes, respectively, the buttons 222*b*-226*b*, and indicates a function of the respective tool associated with the respective buttons 222*b*-226*b*.

In some embodiments, the contextual information describes one or more functions of the virtual object. For example, text items 222*c*-226*c* describe respective functions associated with respective controls of the of the UI object. Additionally or alternatively, the contextual information describes an interaction type with the virtual object (e.g., "swipe left," "shake controller"), a description of a context of the virtual object (e.g., "interactive with light sources"), or any other suitable description.

Although FIG. 2 depicts the contextual information as text items 222*c*-226*c* visible in VR display 230*b*, other embodiments are envisioned. For example, the VR environment 200 is modified to include audible information, such as an alert sound, or speech describing a function of a tool associated with the UI object. Additionally or alternatively, the VR environment 200 is modified to include additional visual information, including non-textual information, such as a change in appearance of the UI object, or a change in appearance of an additional object that is affected by the UI object (e.g., a particular object affected by a particular tool).

Figure 3:
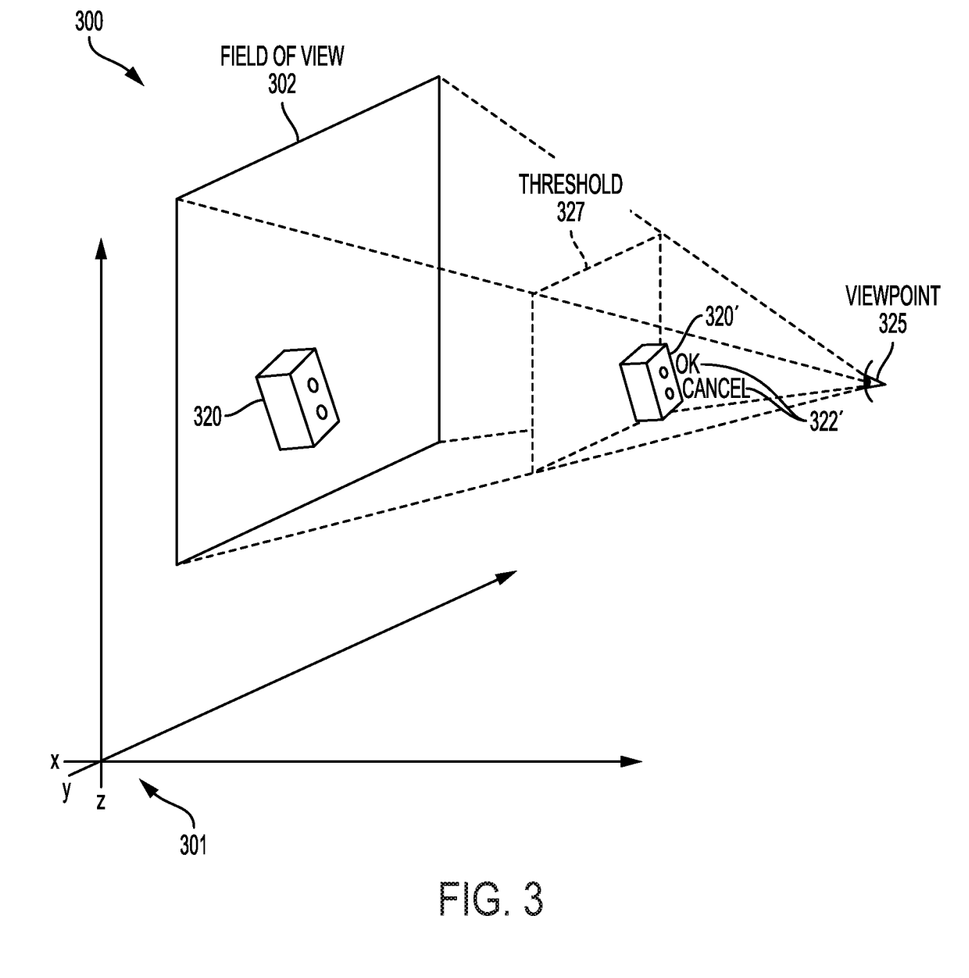
FIG. 3 is a diagram depicting an example of a VR environment that is modified to include or remove contextual information based on a context of the VR environment, according to certain embodiments.

In some embodiments, a VR environment is modified to include or remove contextual information based on a context of the VR environment. The context includes, for example, a location of a UI object within the VR environment, a location of a viewpoint within the VR environment, a distance between the object's location and the viewpoint's location, or any other suitable context. FIG. 3 depicts an example of a VR environment 300 having a coordinate system 301. Coordinate system 301 is depicted as a Cartesian system having three axes (e.g., x-axis, y-axis, z-axis), but any suitable coordinate system (or systems) may be used, including polar, cylindrical, or other systems.

A user (including a developer) of the VR environment 300 interacts with the environment, such as via a viewpoint 325, a UI object 320, or a UI object 320'. For example, the user receives visual information (such as via the VR output device 145) based on the viewpoint 325 within the VR environment 300. The viewpoint 325 has a viewpoint location within the VR environment 300, such as a viewpoint location based on the coordinate system 301 (e.g., a viewpoint location with $x_v$, $y_v$, $z_v$ coordinates). Additionally or alternatively, the viewpoint 325 has a viewpoint orientation within the VR environment 300, such as a direction of the user's virtual gaze. In some cases, the user receives visual information based on the location, direction, or both, of the viewpoint 325. For example, the viewpoint 325 is associated with a field of view 302. The field of view 302 indicates one or more regions of the VR environment 300 that are visible to the user (e.g., regions for which the VR output device 145 provides visual information). The field of view 302 is depicted as a rectangular region within the VR environment 300, but any suitable configuration may be used, including other polygonal, circular, irregular, or other configurations. In some cases, the viewpoint 325 is associated with multiple fields of view, such as multiple fields for three-dimensional visual information, or fields offering forward- and backward-facing visual information (e.g., a rear-view mirror).

Additionally or alternatively, the user provides information (such as via the VR input device 140) to the VR environment 300 based on the UI objects 320 or 320'. In FIG. 3, the UI objects 320 and 320' represent a particular UI object that is moved by the user between locations within the VR environment 300. For example, the UI object 320 has an object location within the VR environment 300, such as an object location based on the coordinate system 301 (e.g., an object location with $x_o$, $y_o$, $z_o$ coordinates). Additionally or alternatively, the UI object 320 has an object orientation within the VR environment 300, such as a direction in which the UI object 320 is pointing. Furthermore, the UI object 320' has an additional object location and an additional object orientation within the VR environment 300. In some cases, the user receives visual information based on the location, direction, or both, of the UI objects 320 or 320'. For example, one of the UI objects 320 or 320' is apparent within the field of view 302. In some cases, the visual information describing the appearance of the UI objects 320 and 320' is based upon the location, direction, or both, of the UI objects 320 and 320' within the VR environment 300. For example, the UI object 320 has an appearance of a larger or smaller displayed object (e.g., one of displayed objects 220*a* or 220*b*) based on the object location of UI object 320, or on a distance between the object location of UI object 320 and the viewpoint location of viewpoint 325. In an embodiment, only one of the UI objects 320 or 320' is apparent within the field of view 302 at a particular point in time. Additionally or alternatively, each of the UI objects 320 or 320' is apparent at the particular point in time, or one of the UI objects 320 or 320' has a modified appearance (e.g., a translucent appearance based on a previous object location at a previous point in time).

In FIG. 3, the VR environment 300 is modified based on a distance between the viewpoint location of viewpoint 325 and the object location of UI objects 320 and 320'. Additionally or alternatively, the VR environment 300 is modified based on whether the distance between the viewpoint location and the object location is greater than, less than, or equal to a threshold distance 327. The threshold distance 327 is depicted as a rectangular plane within the VR environment 300, but any suitable configuration may be used, including a curved plane, a distance based on a radius from the viewpoint 325 or from the UI object 320, or any other suitable configuration. In some cases, the threshold distance 327 is based upon an indication received from a user, such as a value of a setting determined by the user. Additionally or alternatively, the threshold distance 327 is based upon a parameter associated with the VR environment 300, such as a default value.

In some embodiments, based on the object location and the viewpoint location, a distance between the UI object 320 and the viewpoint 325 is determined to be greater than the threshold distance 327. Responsive to determining that the distance is greater than the threshold distance 327, the VR environment 300 is modified to remove contextual information describing the UI object 320. Additionally or alternatively, based on the object location and the viewpoint location, an additional distance between the UI object 320' and the viewpoint 325 is determined to be equal or less than the threshold distance 327. Responsive to determining that the additional distance is equal or less than the threshold distance 327, the VR environment 300 is modified to include contextual information describing the UI object 320', such as contextual information 322'. The contextual information 322' describes, for example, functions associated with the UI object 320', such as functions that are associated with controls present on the UI object 320'.

Figure 4:
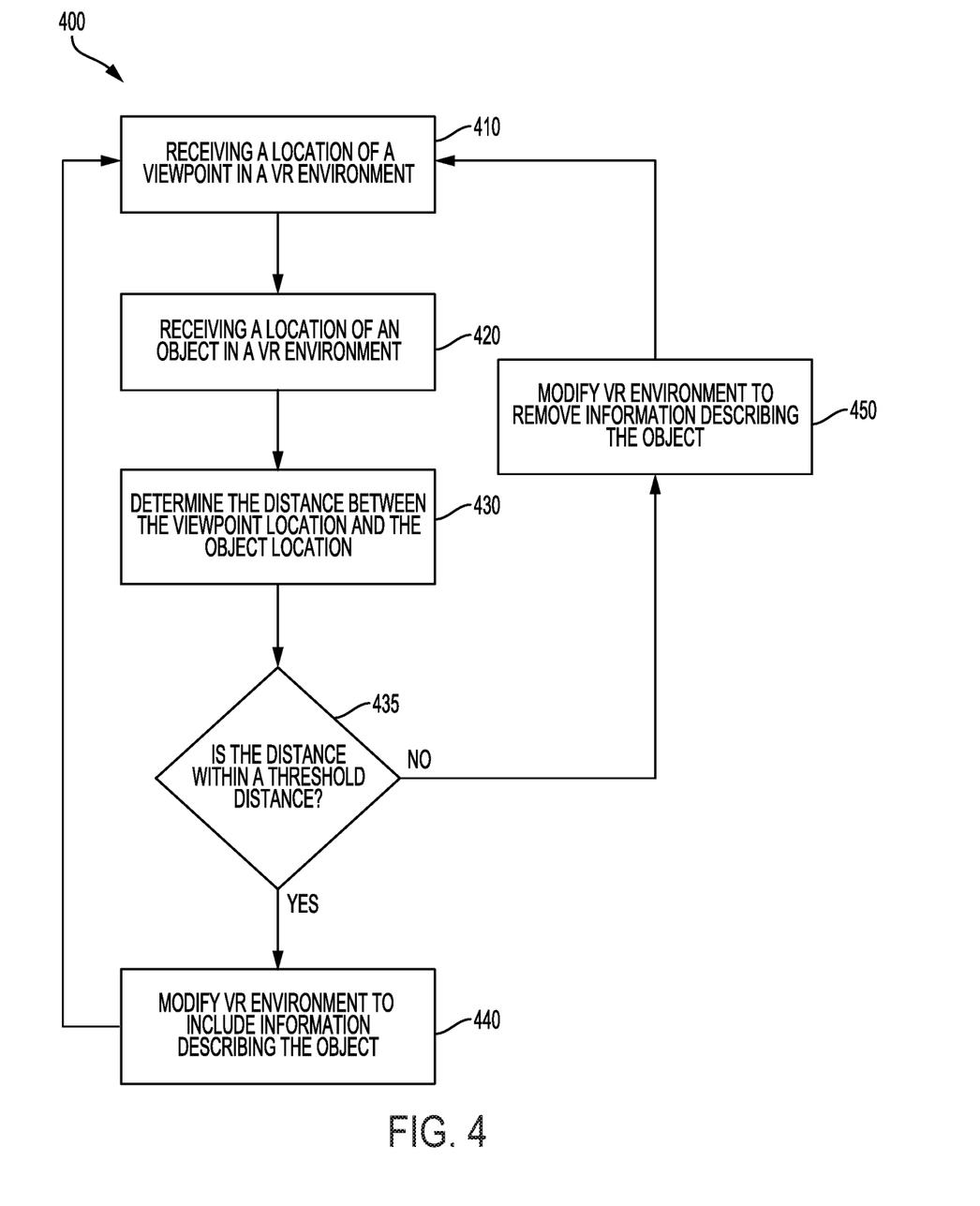
FIG. 4 is a flow chart depicting an example of a process for modifying a VR environment to provide contextual information describing an object in the VR environment, according to certain embodiments.

FIG. 4 is a flow chart depicting an example of a process 400 for providing contextual information describing an object in a VR environment. In some embodiments, such as described in regards to FIGS. 1-3, a computing system executing a VR platform implements operations described in FIG. 4, by executing suitable program code. For illustrative purposes, the process 400 is described with reference to the examples depicted in FIGS. 1-3. Other implementations, however, are possible.

At block 410, the process 400 involves receiving a location of a viewpoint in a VR environment. The viewpoint location is associated, for example, with a position of the viewpoint. In some embodiments, the position calculation module 160 included in the VR platform 150 determines the location of the viewpoint 125 within the VR environment 110. For example, the position calculation module 160 determines the viewpoint location based on a relative or absolute location within the environment, such as a virtual location based on a coordinate system of the VR environment 110. Additionally or alternatively, the viewpoint location is based on a physical location associated with the viewpoint 125, such as a physical location associated with the VR output device 145.

At block 420, the process 400 involves receiving a location of an object in the VR environment. The object location is associated, for example, with a position of the object. In some cases, the object is a UI object, such as UI object 120. In some embodiments, the position calculation module 160 included in the VR platform 150 determines the location of the UI object 120 within the VR environment 110. For example, the position calculation module 160 determines the object location based on a virtual location within the environment, such as a relative or absolute location based on a coordinate system of the VR environment 110. Additionally or alternatively, the object location is determined based on a physical location associated with the UI object 120, such as a physical location associated with the VR input device 140.

At block 430, the process 400 involves determining a distance between the viewpoint location and the object location. For example, the position calculation module 160 determines the distance between the UI object 120 and the viewpoint 125. In some cases, the distance is determined based on virtual locations, such as virtual locations based on the coordinate system of the VR environment 110. Additionally or alternatively, the distance is determined based on physical locations associated with the UI object 120 and the viewpoint 125, such as the physical locations associated with the VR input device 140 and the VR output device 145.

At block 435, the process 400 involves determining whether the distance between the viewpoint location and the object location is within a threshold distance. For example, the position calculation module 160 compares the distance to the threshold distance. If operations related to block 435 determine that the distance is equal to or less than the threshold distance, process 400 proceeds to another block, such as block 440 or 410. If operations related to block 435 distance is greater than the threshold distance, process 400 proceeds to another block, such as block 450 or 410.

At block 440, the process 400 involves modifying the VR environment to include information describing the object. For example, responsive to determining that the distance is within the threshold distance, the VR environment 110 is modified to include contextual information describing one or more functions associated with the UI object 120. In some cases, the contextual information includes visual information, such as text describing one or more functions of the UI object 120, an appearance indicating a function of the UI object 120 (e.g., highlighting a virtual button), or other suitable visual information. Additionally or alternatively, the contextual information includes audio information, such as speech describing one or more functions of the UI object 120, an alert sound, or other suitable audio information. In some cases, the contextual information is provided in a region of the VR environment that includes the described object. For example, VR environment 110 is modified to include descriptive text displayed adjacent to UI object 120, such that the displayed text remains adjacent to the UI object 120 while the distance between the viewpoint location and the object location is within the threshold distance (e.g., the displayed text moves with the UI object). Additionally or alternatively, the contextual information is displayed adjacent to one or more particular areas of the described object. For example, VR environment 110 is modified to include descriptive text associated with specific controls on the UI object 120, such that the particular text describing the function of a particular button remains adjacent to the particular button while the distance between the viewpoint location and the object location is within the threshold distance. In some cases, the contextual information displayed adjacent to a particular area of the described object remains adjacent to the particular area, even if the described object is rotated or otherwise moved around (e.g., within the threshold distance).

At block 450, the process 400 involves modifying the VR environment to remove information describing the object. For example, responsive to determining that the distance is greater than the threshold distance, the VR environment 110 is modified to remove contextual information describing one or more functions associated with the UI object 120.

In some cases, operations related to one or more blocks of the process 400 are repeated. For example, operations related to one or more of blocks 410, 420, 430, or 435 are repeated, including prior to or subsequent to operations related to one or more of blocks 440 or 450. In some cases, a VR environment is modified multiple times based on one or more repetitions operations related to process 400. For example, the VR environment 300 is modified multiple times to include contextual information 322' or to remove contextual information 322', based on the distance between the viewpoint 325 and UI objects 320 or 320' being less than or greater than the threshold distance 327.

In some embodiments, a VR environment is modified to include or remove contextual information based on a duration of a context in the VR environment. For example, VR environment 300 is modified to include the contextual information 322' based on the UI object 320' having a particular location, or a particular orientation, or both, for an amount of time. In some cases, the object location (or orientation) of the UI object 320' is compared (e.g., by one or more of the VR platform 150 or the position calculation module 160) to one or more previous locations (or orientations) of the UI object 320'. Additionally or alternatively, a similarity is determined between the object location (or orientation) and the previous location (or orientation). For example, coordinates associated with the object location are compared to previous coordinates associated with the previous location, such as within the coordinate system 301. A similarity between the coordinates and the previous coordinates is determined, for example, based on a difference between the coordinates and the previous coordinates. In some cases, the similarity is determined based on a cumulative change of the position of the UI object 320', such as to accommodate natural or unconscious motion of the user interacting with the VR environment 300. For example, a cumulative amount of motion is determined based on a summation of position differences for the UI object 320' (e.g., changes in location, changes in orientation) during a window of time. If the cumulative amount of motion is below a threshold amount of motion (e.g., the user is holding the object still), the UI object 320' is determined to have a similar position during the window of time. A similarity or a cumulative change of position are determined, for example, based on one or more of a physical location (or orientation) or a virtual location (or orientation). Responsive to determining that the change of position is equal to or less than a threshold change (e.g., the user has held the UI object 320' at a particular location or orientation for a period of time), the VR environment 300 is modified to include the contextual information 322'.

In some cases, a time (e.g., a timestamp) is associated with one or more of the coordinates or the previous coordinates. For example, responsive to determining that the UI object 320' has a location, a current time is determined, indicating a time associated with the UI object's current position at the location. Additionally or alternatively, responsive to determining a similarity between the object location and a previous location, an elapsed time is determined, based on a comparison of the current time with a previous time associated with the previous location.

Figure 5:
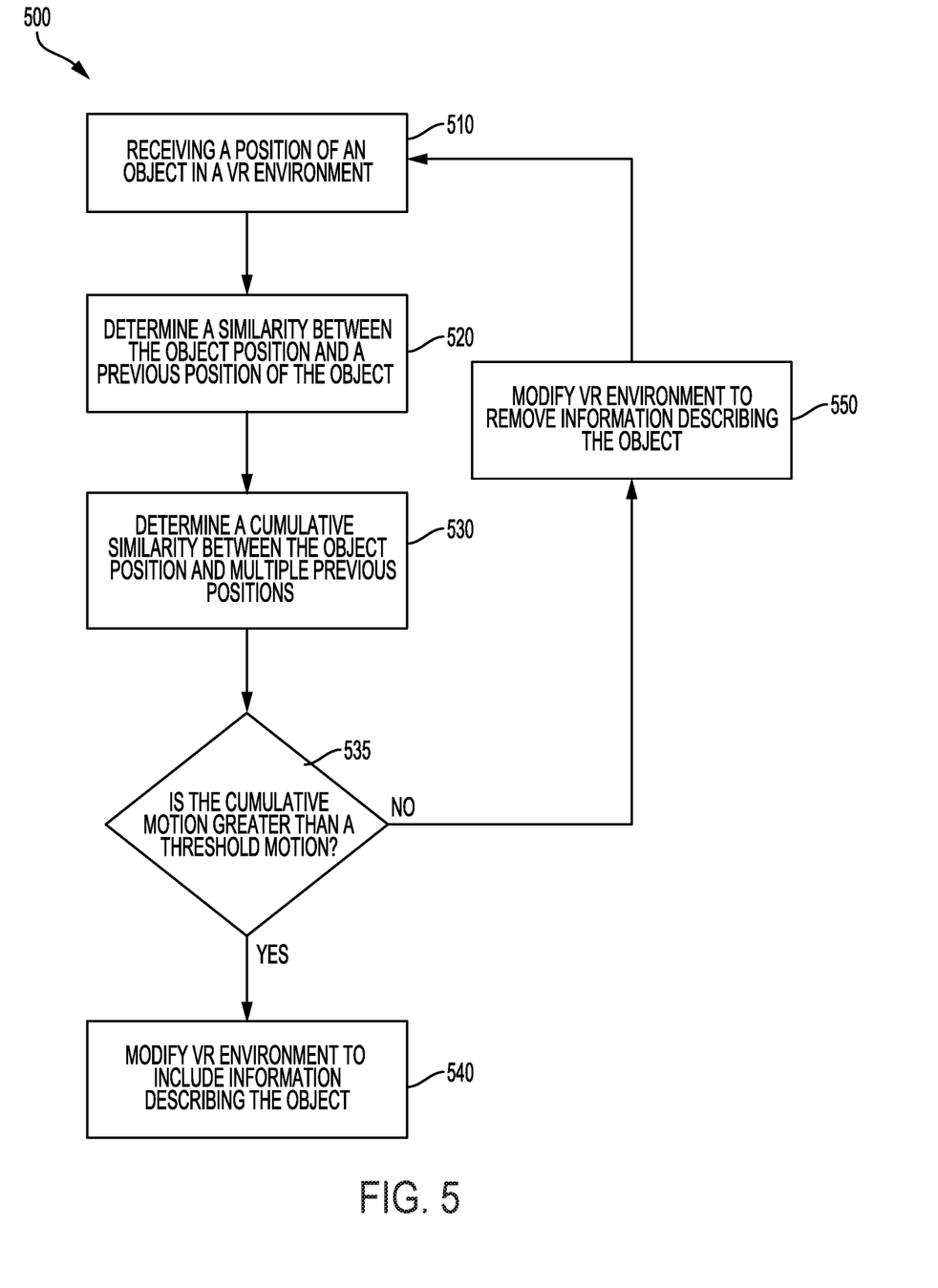
FIG. 5 is a flow chart depicting an example of a process for modifying a VR environment to provide contextual information describing an object in the VR environment based on a cumulative amount of motion of the object within the VR environment, according to certain embodiments.

FIG. 5 is a flow chart depicting an example of a process 500 for providing contextual information describing an object in a VR environment based on an duration of a context within the VR environment. In some embodiments, such as described in regards to FIGS. 1-4, a computing system executing a VR platform implements operations described in FIG. 5, by executing suitable program code. For illustrative purposes, the process 500 is described with reference to the examples depicted in FIGS. 1-4. Other implementations, however, are possible.

At block 510, the process 500 involves receiving a position of an object in the VR environment. The position of the object includes, for example, one or more of an object location or an object orientation. In some cases, the object is a UI object, such as UI object 120. In some embodiments, the position calculation module 160 included in the VR platform 150 determines the location or orientation of the UI object 120 within the VR environment 110. For example, the position calculation module 160 determines the object location based on a virtual location within the environment, such as a relative or absolute location based on a coordinate system of the VR environment 110. Additionally or alternatively, the object location is determined based on a physical location associated with the UI object 120, such as a physical location associated with the VR input device 140. In some embodiments, information representing the object position is stored, such as a historical log (e.g., included in a data structure accessible by VR platform 150) including the current object position and one or more previous positions of the object. Additionally or alternatively, a time associated with the current object position is stored, such as in a historical log (such as, without limitation, the historical log including object positions) including the current time and one or more previous times associated with respective previous object positions. In some cases, a window of time is associated with the current object position, such as a window of time including set of n previous object positions. For example, if the current object position $C_t$ has an associated time t, the window of time includes the set of n previous positions associated respectively with the times t−1 through t−n. In some cases, the set of n previous positions are sequential positions. Additionally or alternatively, the set of n previous positions are a subset of the total number of previous positions available (e.g., omitting erroneous or poor-quality position data).

At block 520, the process 500 involves determining a similarity between the object position and a previous object position. For example, the position calculation module 160 (or another module included in VR platform 150) determines a similarity between coordinates associated with the object location and previous coordinates associated with the previous object location, based on the coordinate system of the VR environment 110. Additionally or alternatively, the similarity is determined based on information representing current and previous physical locations associated with the UI object 120, such as (without limitation) accelerometer information received from the VR input device 140. In some cases, the similarity is based on a cumulative difference, a percentage difference, a change over time, an average difference across multiple positions, or any other suitable technique.

In some embodiments, the similarity is based on a numerical difference calculated between values of current and previous positions (e.g., a distance between current and previous locations). For example, the position calculation module 160 (or another module included in VR platform 150) determines a similarity based on an amount of motion between the current object position and one or more of the previous positions. In some cases, the amount of motion is determined based on the window of time associated with the current object position, or with the set of n previous positions included in the window of time. In the set of n previous positions, for example, a given previous position $P_i$ is associated with time i. The position calculation module 160, for example, calculates a difference between each successive pair of the n previous positions, such as a difference between the previous positions $P_i$ and $P_{i+1}$. In some cases, the position calculation module 160 calculates a difference between the current object position $C_t$ and the most recent previous position in the set (e.g., a difference between $C_t$ and $P_{t-1}$). The calculated differences are based on, for example, a vector displacement between locations, an angular displacement between orientations, a displacement between coordinates, or any other suitable technique or combination of techniques.

At block 530, the process 500 involves determining a cumulative similarity of the object position and multiple previous positions. For example, the position calculation module 160 (or another module included in VR platform 150) determines a cumulative amount of motion corresponding to the current object position and the set of n previous positions included in the window of time. The cumulative amount of motion is based, for example, on a summation of calculated differences between the current object position and previous object positions, such as pairwise differences described in regards to block 520. In some cases, the cumulative amount of motion indicates that a user is holding the UI object relatively still (e.g., a low amount of cumulative motion) or is moving the UI object (e.g., a higher amount of cumulative motion).

At block 535, the process 500 involves determining whether the cumulative amount of motion exceeds a threshold amount of motion. For example, the position calculation module 160 compares the cumulative motion to the threshold amount of motion. If operations related to block 535 determine that the cumulative motion is less than or equal to the threshold amount of motion, process 500 proceeds to another block, such as block 540 or 510. If operations related to block 535 determine that the cumulative motion is greater than the threshold amount of motion, process 500 proceeds to another block, such as block 550 or 510.

At block 540, the process 500 involves modifying the VR environment to include information describing the object. For example, responsive to determining that the cumulative motion is within the threshold amount of motion, the VR environment 110 is modified to include contextual information describing one or more functions associated with the UI object 120. In some cases, the contextual information includes visual information, audio information, or other suitable information. In some cases, the contextual information is provided in a region of the VR environment that includes the described object. Additionally or alternatively, the contextual information is displayed adjacent to one or more particular areas of the described object. For example, VR environment 110 is modified to include descriptive text associated with specific controls on the UI object 120.

At block 550, the process 500 involves modifying the VR environment to remove information describing the object. For example, responsive to determining that the cumulative motion exceeds the threshold amount of motion, such as if the UI object 120 had recently been moved to a different location or changed orientation, the VR environment 110 is modified to remove contextual information describing one or more functions associated with the UI object 120.

In some cases, operations related to one or more blocks of the process 500 are repeated. For example, operations related to one or more of blocks 510, 520, 530, or 535 are repeated, including prior to or subsequent to operations related to one or more of blocks 540 or 550. In some cases, a VR environment is modified multiple times based on one or more repetitions operations related to process 500. For example, the VR environment 300 is modified multiple times to include contextual information 322' or to remove contextual information 322', based on the threshold amount of motion being greater or less than the cumulative motion associated with the current position of the UI objects 320 or 320'.

In some embodiments, a comparison is based in part on a one or more hysteresis parameters. For example, the position calculation module 160 compares a distance between an object location and a viewpoint location with a threshold distance adjusted by a hysteresis parameter. Responsive to determining that the distance between the object and viewpoint locations is within (or outside of) the adjusted threshold distance, the VR environment 110 is modified to include (or remove) contextual information describing UI object 120. Additionally or alternatively, the position calculation module 160 compares a cumulative amount of motion with a threshold amount of motion adjusted by a hysteresis parameter. Responsive to determining that the cumulative motion distance is less than (or exceeds) the adjusted threshold amount of motion, the VR environment 110 is modified to include (or remove) contextual information describing UI object 120.

If a distance between an object and a viewpoint is very close to a threshold distance, or if the amount of cumulative motion is very close to a threshold amount of motion, the VR environment may be modified multiple times in quick succession. For example, small variations in the distance may result in the distance being determined to alternate rapidly between greater than and less than the threshold distance. The small variations in the distance between the object and the viewpoint are caused, for example, by unconscious user movement (e.g., breathing, trembling hands), accuracy of sensors, numerical outcomes of mathematical operations to calculate the distance, or other sources of variation. In some cases, the small variations in the distance result in the VR environment being modified to include and remove contextual information multiple times in a short amount of time. In some cases, rapid alternating modifications to the VR environment (e.g., "flicker") result in the contextual information being seen or heard by the user multiple times in a short amount of time, and may cause annoyance or frustration to the user.

Figure 6:
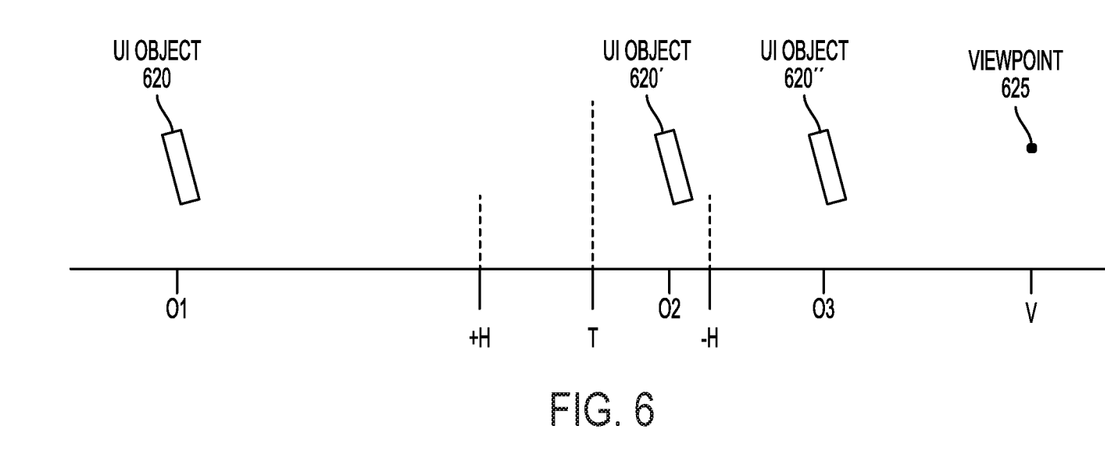
FIG. 6 is a diagram depicting an example of a threshold distance adjusted by a hysteresis parameter, according to certain embodiments.
Figure 7:
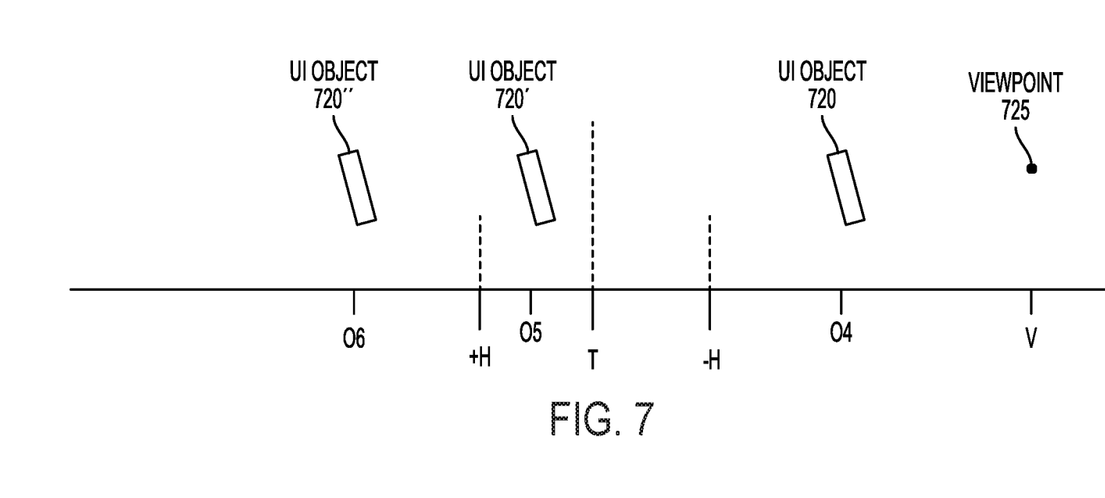
FIG. 7 is a diagram depicting an example of a threshold distance adjusted by a hysteresis parameter, according to certain embodiments.

In some embodiments, adjusting a threshold distance or a threshold amount of motion based on one or more hysteresis parameters prevents flicker that is perceptible to the user. Each of FIGS. 6 and 7 depicts a diagram illustrating an example of a threshold distance adjusted by a hysteresis parameter. For example, an adjusted threshold distance is based on reducing the value of the threshold distance by a value of a hysteresis parameter. In FIG. 6, a UI object 620 and a viewpoint 625 are each included in a VR environment. The UI object 620 has an object location O1, and the viewpoint 625 has a viewpoint location V. The distance between viewpoint location V and the object location O1 is greater than a threshold distance T. The threshold distance T is adjusted by one or more hysteresis parameters, such as hysteresis parameters +H and −H. In some cases, while the UI object 620 has the object location O1, the VR environment does not include contextual information describing the UI object 620.

In some cases, the distance between the UI object 620 and the viewpoint 625 is modified, such as if either the UI object 620 or viewpoint 625 is moved within the VR environment. For example, the UI object 620' is moved to another object location O2. The distance between the viewpoint location V and the object location O2 is less than the threshold distance T, but greater than the threshold distance T adjusted by hysteresis parameter −H (e.g., the value of threshold distance T *minus* the value of H). Responsive to determining that the distance between the viewpoint location V and the object location O2 is greater than the adjusted threshold distance T-H, the VR environment of FIG. 6 is not modified.

Additionally or alternatively, the UI object 620" is moved to another object location O3. The distance between the viewpoint location V and the object location O3 is less than the adjusted threshold distance T-H. Responsive to determining that the distance between the viewpoint location V and the object location O3 is less than the adjusted threshold distance T-H, the VR environment of FIG. 6 is modified to include contextual information describing the UI object 620".

In some cases, an adjusted threshold distance is based on increasing the value of the threshold distance by a value of a hysteresis parameter. In FIG. 7, a UI object 720 and a viewpoint 725 are each included in a VR environment. The UI object 720 has an object location O4, and the viewpoint 725 has a viewpoint location V. The distance between viewpoint location V and the object location O4 is less than a threshold distance T. The threshold distance T is adjusted by one or more hysteresis parameters, such as hysteresis parameters +H and −H. In some cases, while the UI object 720 has the object location O4, the VR environment includes contextual information describing the UI object 720.

In some cases, the distance between the UI object 720 and the viewpoint 725 is modified, such as if either the UI object 720 or viewpoint 725 is moved within the VR environment. For example, the UI object 720' is moved to another object location O5. The distance between the viewpoint location V and the object location O5 is greater than the threshold distance T, but less than the threshold distance T adjusted by hysteresis parameter +H (e.g., the value of threshold distance T plus the value of H). Responsive to determining that the distance between the viewpoint location V and the object location O5 is less than the adjusted threshold distance T+H, the VR environment of FIG. 7 is not modified.

Additionally or alternatively, the UI object 720" is moved to another object location O6. The distance between the viewpoint location V and the object location O6 is greater than the adjusted threshold distance T+H. Responsive to determining that the distance between the viewpoint location V and the object location O6 is greater than the adjusted threshold distance T+H, the VR environment of FIG. 7 is modified to remove contextual information describing the UI object 720".

Figure 8:
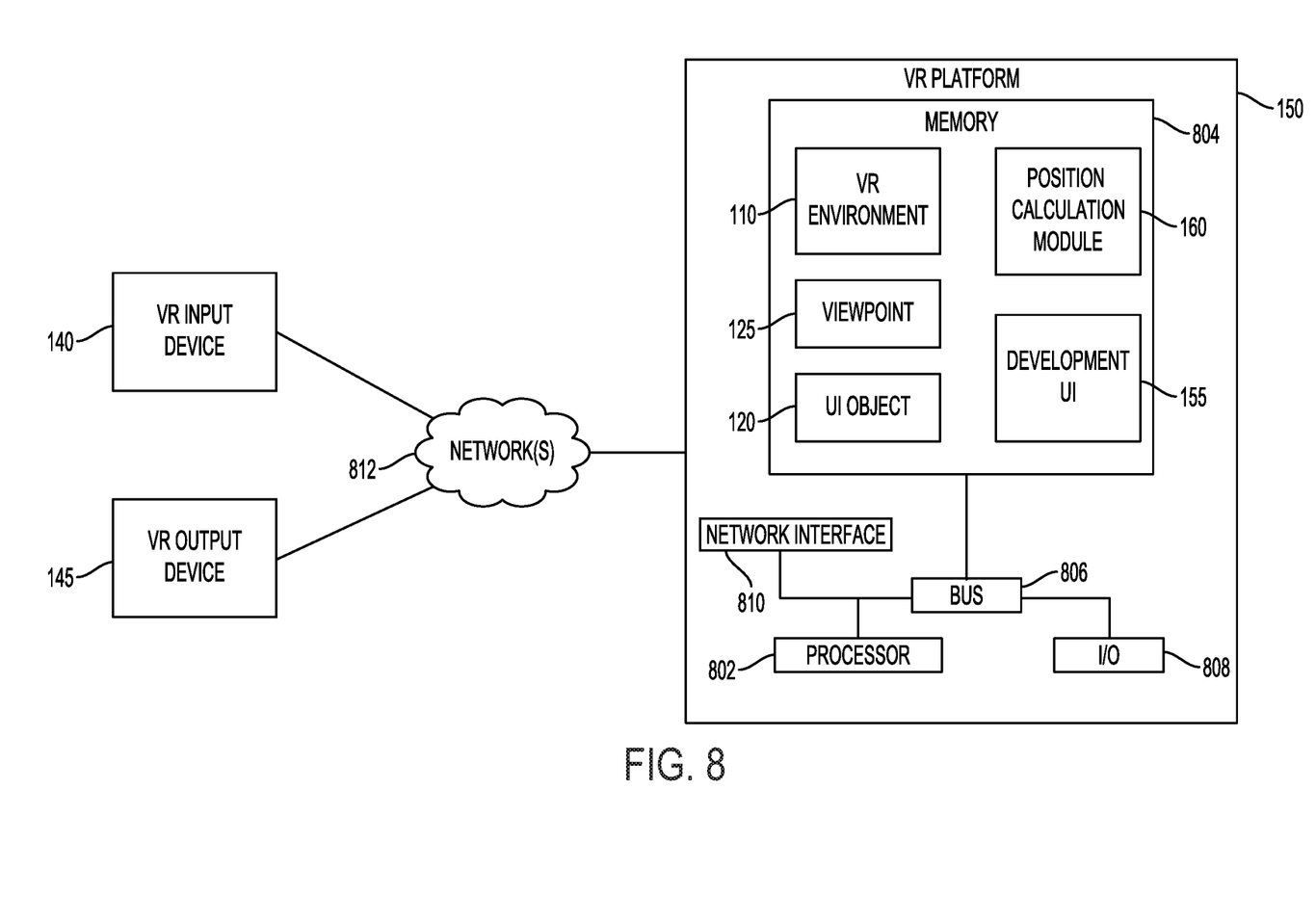
FIG. 8 is a diagram depicting an example of a computing system for implementing a VR platform for operating a VR environment, according to certain embodiments.

Any suitable computing system or group of computing systems can be used for performing the operations described herein. For example, FIG. 8 is a block diagram depicting a computing system capable of modifying a VR environment to include contextual information describing objects within the VR environment, according to certain embodiments.

The depicted example of a VR platform 150 includes one or more processors 802 communicatively coupled to one or more memory devices 804. The processor 802 executes computer-executable program code or accesses information stored in the memory device 804. Examples of processor 802 include a microprocessor, an application-specific integrated circuit ("ASIC"), a field-programmable gate array ("FPGA"), or other suitable processing device. The processor 802 can include any number of processing devices, including one.

The memory device 804 includes any suitable non-transitory computer-readable medium for storing the VR environment 110, the UI object 120, the viewpoint 125, the position calculation module 160, the development UI 155, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The VR platform 150 may also include a number of external or internal devices such as input or output devices. For example, the VR platform 150 is shown with an input/output ("I/O") interface 808 that can receive input from input devices or provide output to output devices. A bus 806 can also be included in the VR platform 150. The bus 806 can communicatively couple one or more components of the VR platform 150.

The VR platform 150 executes program code that configures the processor 802 to perform one or more of the operations described above with respect to FIGS. 1-7. The program code includes operations related to, for example, one or more of the VR environment 110, the UI object 120, the viewpoint 125, the position calculation module 160, the development UI 155, or other suitable applications or memory structures that perform one or more operations described herein. The program code may be resident in the memory device 804 or any suitable computer-readable medium and may be executed by the processor 802 or any other suitable processor. In some embodiments, the program code described above, the VR environment 110, the UI object 120, the viewpoint 125, the position calculation module 160, and the development UI 155 are stored in the memory device 804, as depicted in FIG. 8. In additional or alternative embodiments, one or more of the VR environment 110, the UI object 120, the viewpoint 125, the position calculation module 160, the development UI 155, and the program code described above are stored in one or more memory devices accessible via a data network, such as a memory device accessible via a cloud service.

The VR platform 150 depicted in FIG. 8 also includes at least one network interface 810. The network interface 810 includes any device or group of devices suitable for establishing a wired or wireless data connection to one or more data networks 812. Non-limiting examples of the network interface 810 include an Ethernet network adapter, a modem, a wireless modem, and/or the like. In some cases, the VR platform 150 is able to communicate with one or more of the VR input device 140 and the VR input device 145 using the network interface 810. Although FIG. 8 depicts the VR input device 140 and the VR input device 145 as connected to VR platform 150 via the networks 812, other embodiments are possible, including one or both of the VR input device 140 or the VR input device 145 communicating with the VR platform 150 via one or more wired connections, such as via I/O interface 808.

General Considerations

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of using one or more processing devices to provide information in a virtual reality (VR) environment, the method comprising:
    determining a first location associated with a user interface (UI) object in the VR environment and a second location associated with an additional object in the VR environment;
    determining that the first location is within a threshold distance from the second location;
    determining a previous location associated with the UI object in the VR environment within the threshold distance, the first location having a first timestamp that is subsequent to a previous timestamp of the previous location;
    calculating, based on a location difference between the first location and the previous location, a cumulative motion of the UI object while the UI object is within the threshold distance; and
    responsive to determining that the cumulative motion of the UI object while the UI object is within the threshold distance is less than or equal to a threshold amount of motion, modifying the VR environment to output information describing the additional object.

2. The method of claim 1, wherein:
    modifying the VR environment includes outputting contextual information describing the UI object, and
    the contextual information describing the UI object comprises one or more of: a description of a function of the UI object, a description of an interaction type with the UI object, or a description of a context of the UI object.

3. The method of claim 2, wherein a visual component of the contextual information is displayed adjacent to a described control on the UI object.

4. The method of claim 1, wherein modifying the VR environment includes modifying an appearance of the additional object.

5. The method of claim 1, wherein the output information describing the additional object includes one or more of visual information or audio information.

6. The method of claim 1, wherein the threshold distance is adjusted by a hysteresis parameter, and wherein modifying the VR environment is further responsive to determining that the location difference between the first location and the previous location is within the adjusted threshold distance.

7. The method of claim 1, further comprising:
    determining an additional distance between the first location and a viewpoint location associated with a viewpoint in the VR environment; and
    responsive to determining the additional distance, further modifying the VR environment to include additional information describing the UI object.

8. The method of claim 7, wherein:
    the first location in the VR environment is determined based on a physical location of an input device associated with the UI object, and
    the viewpoint location in the VR environment is determined based on an additional physical location of an output device associated with the viewpoint.

9. A system comprising:
    one or more processors; and
    one or more memory devices communicatively coupled to the one or more processors, the one or more memory devices storing instructions which, when executed by the one or more processors, cause the system to perform:
        determining a first location associated with a user interface (UI) object in a virtual reality (VR) environment and a second location associated with an additional object in the VR environment;
        determining that the first location is within a threshold distance from the second location;
        determining a previous location associated with the UI object in the VR environment within the threshold distance, the first location having a first timestamp that is subsequent to a previous timestamp of the previous location;

calculating, based on a location difference between the first location and the previous location, a cumulative motion of the UI object while the UI object is within the threshold distance; and responsive to determining that the cumulative motion of the UI object while the UI object is within the threshold distance is less than or equal to a threshold amount of motion, modifying the VR environment to output information describing the additional object.

10. The system of claim 9, wherein:

modifying the VR environment includes outputting contextual information describing the UI object, and the contextual information describing the UI object comprises one or more of: a description of a function of the UI object, a description of an interaction type with the UI object, or a description of a context of the UI object.

11. The system of claim 9, wherein modifying the VR environment includes modifying an appearance of the additional object.

12. The system of claim 9, wherein the threshold distance is adjusted by a hysteresis parameter, and wherein modifying the VR environment is further responsive to determining that the location difference between the first location and the previous location is within the adjusted threshold distance.

13. The system of claim 9, wherein the instructions cause the system to further perform:

determining an additional distance between the first location and a viewpoint location associated with a viewpoint in the VR environment; and responsive to determining the additional distance, further modifying the VR environment to include additional information describing the UI object.

14. The system of claim 13, wherein:

the first location in the VR environment is determined based on a physical location of an input device associated with the UI object, and the viewpoint location in the VR environment is determined based on an additional physical location of an output device associated with the viewpoint.

15. A non-transitory computer-readable medium embodying program code for providing information in a virtual reality (VR) environment, the program code comprising instructions which, when executed by a processor, cause the processor to perform operations comprising:

determining a first position associated with a user interface (UI) object in the VR environment and a second position associated with an additional object in the VR environment, wherein the first position and the second position each include a respective object location and a respective object orientation;

determining that the first position is within a threshold distance from the second position;

determining a previous position associated with the UI object in the VR environment within the threshold distance, the first position having a first timestamp that is subsequent to a previous timestamp of the previous position;

calculating, based on a position difference between the first position and the previous position, a cumulative motion of the UI object while the UI object is within the threshold distance; and responsive to determining that the cumulative motion of the UI object while the UI object is within the threshold distance is less than or equal to a threshold amount of motion, modifying the VR environment to include information describing the additional object.

16. The non-transitory computer-readable medium of claim 15, wherein:

modifying the VR environment includes outputting contextual information describing the UI object, and the contextual information describing the UI object comprises one or more of: a description of a function of the UI object, a description of an interaction type with the UI object, or a description of a context of the UI object.

17. The non-transitory computer-readable medium of claim 15, wherein modifying the VR environment includes modifying an appearance of the additional object.

18. The non-transitory computer-readable medium of claim 15, wherein the threshold distance is adjusted by a hysteresis parameter, and wherein modifying the VR environment is further responsive to determining that the position difference between the first position and the previous position is within the adjusted threshold distance.

19. The non-transitory computer-readable medium of claim 15, the instructions causing the processor to perform operations further comprising:

determining an additional distance between the first position and a viewpoint position associated with a viewpoint in the VR environment, wherein the viewpoint position includes an additional respective object location and an additional respective object orientation; and responsive to determining the additional distance, further modifying the VR environment to include additional information describing the UI object.

20. The non-transitory computer-readable medium of claim 19, wherein:

the first position in the VR environment is determined based on a physical location of an input device associated with the UI object, and the viewpoint position in the VR environment is determined based on an additional physical location of an output device associated with the viewpoint.

* * * * *